United States Patent [19]

Wolfer et al.

[11] Patent Number: 5,008,317

[45] Date of Patent: Apr. 16, 1991

[54] COMPOSITIONS WHICH CAN BE CROSSLINKED TO FORM FLAME RETARDANT AND/OR TRACKING RESISTANT AND ARC RESISTANT ORGANOPOLYSILOXANE ELASTOMERS

[75] Inventors: Dietrich Wolfer, Oberndorf, Austria; Wilhelm Marsch, Haiming, Fed. Rep. of Germany

[73] Assignee: Wacker-Chemie GmbH, Munich, Fed. Rep. of Germany

[21] Appl. No.: 407,003

[22] Filed: Sep. 14, 1989

[30] Foreign Application Priority Data

Sep. 16, 1988 [DE] Fed. Rep. of Germany ....... 3831478

[51] Int. Cl.$^5$ ................................................ C08K 5/54
[52] U.S. Cl. ..................................... 524/262; 524/403; 524/413; 524/432
[58] Field of Search ................. 524/262, 403, 413, 432

[56] References Cited

U.S. PATENT DOCUMENTS

| | | | |
|---|---|---|---|
| 3,711,520 | 1/1973 | Pfeifer et al. | 524/403 |
| 3,821,140 | 6/1974 | Milkert | 524/403 |
| 3,862,082 | 1/1975 | Hatanaka et al. | 524/413 |
| 3,965,065 | 6/1976 | Elliott | 260/37 |
| 4,399,064 | 8/1983 | Penneck | 523/173 |
| 4,419,474 | 12/1983 | Ackermann et al. | 524/195 |
| 4,604,424 | 8/1986 | Cole et al. | 524/432 |
| 4,618,642 | 10/1986 | Schoenherr | 524/532 |

Primary Examiner—Veronica P. Hoke

[57] ABSTRACT

Compositions which can be crosslinked to form flame retardant and/or tracking resistant and arc resistant organopolysiloxane elastomers which comprises adding to a cross-linkable organopolysiloxane an additive which is obtained by mixing (A) 60 to 80 percent by weight of diorganopolysiloxane having 75 to 85 mol percent of dimethylsiloxane units and 15 to 25 mol percent of vinylmethylsiloxane units, (B) 20 to 35 percent by weight of a metal oxide selected from the group consisting of titanium dioxide, zirconium dioxide, zinc oxide, Ce(III) oxide and Ce(IV) oxide, (C) 0.05 to 0.25 percent by weight of platinum, calculated as the element, (D) 1 to 5 percent by weight of an organosilicon compound having basic nitrogen bonded via carbon to silicon in which the sum of the percentages (A) to (D) adds up to 100 percent by weight based on the total weight of the additive.

In order to achieve tracking resistance and arc resistance, only titanium dioxide or zirconium dioxide are used, while any of the metal oxides can be used to achieve flame resistance.

The additive is present in the composition in amounts of from 1 to 4 percent by weight, based on the total weight of the composition.

20 Claims, No Drawings

COMPOSITIONS WHICH CAN BE CROSSLINKED TO FORM FLAME RETARDANT AND/OR TRACKING RESISTANT AND ARC RESISTANT ORGANOPOLYSILOXANE ELASTOMERS

The present invention relates to organopolysiloxane compositions which crosslink to form organopolysiloxane elastomers in which the organopolysiloxane elastomers are flame resistance and/or have high tracking resistance and high arc resistance. More particularly, the present invention relates to a process for preparing organopolysiloxane compositions and elastomers which are flame resistance, have high tracking resistance and high arc resistance.

BACKGROUND OF THE INVENTION

Flame resistant polysiloxane molding compositions are described in U.S. Pat. No. 4,419,474 to Ackermann et al, which contain diorganopolysiloxanes, finely divided silica and/or other fillers, finely divided titanium dioxide, platinum compound and a guanidine or urea derivative. According to U.S. Pat. No. 3,965,065 to Elliott and U.S. Pat. No. 4,399,064 to Penneck, tracking resistant or arc resistant organopolysiloxane elastomers are obtained by adding very large amounts of aluminum hydroxide and other metal oxides which function as synergistic additives for aluminum hydroxide.

Therefore, it is an object of the present invention to provide organopolysiloxane compositions which can be crosslinked to form organopolysiloxane elastomers having flame retardant, anti-tracking and arc resistant properties. Another object of the present invention is to provide organopolysiloxane compositions containing an additive to impart flame retardant, anti-tracking and arc resistant properties which can be crosslinked by peroxides. Another object of the present invention is to provide organopolysiloxane compositions containing additives which do not prevent or impair coloring of the compositions with diverse pigments. Still another object of the present invention is to provide organopolysiloxane compositions containing additives which do not impair the mechanical properties of the organopolysiloxane elastomers. A further object of the present invention is to provide organopolysiloxane compositions containing additives which are pourable. A still further object of the present invention is to provide organopolysiloxane compositions containing additives which crosslink to form soft organopolysiloxane elastomers having a Shore A hardness below 50.

SUMMARY OF THE INVENTION

The foregoing objects and others which will become apparent from the following description are accomplished in accordance with this invention, generally speaking, by providing crosslinked organopolysiloxane elastomers having flame retardant, anti-tracking and arc resistance properties which comprises adding to crosslinkable organopolysiloxane compositions an additive which is obtained by mixing (A) 60 to 80 percent by weight of diorganopolysiloxanes having 75 to 85 mol percent of dimethylsiloxane units and 15 to 25 mol percent of vinylmethylsiloxane units, (B) 20 to 35 percent by weight of a metal oxide selected from the group consisting of titanium dioxide, zirconium dioxide, zinc oxide, Ce(III) oxide and Ce (V) oxide, with the proviso that in order to achieve tracking resistance and arc resistance only titanium dioxide or zirconium dioxide is used, while any of the metal oxides can be used to achieve flame resistance, (C) 0.05 to 0.25 percent by weight of platinum, calculated as the element, in the form of a platinum compound or of a platinum complex, (D) 1 to 5 percent by weight of an organosilicon compound having a basic nitrogen bonded via carbon to silicon in which the sum of the percentages selected from (A) to (D) must add up to 100 percent by weight based on the total weight of the additive.

Preferably, the additive of this invention is present in the compositions in amounts of from 1 to 4 percent by weight, based on the total weight of the compositions.

DESCRIPTION OF THE INVENTION

Component (A) of the additive of this invention, i.e., the vinyl-rich diorganopolysiloxane, may contain in addition to the dimethylsiloxane units and vinylmethylsiloxane units, other siloxane units such as phenylmethylsiloxane units in amounts up to a maximum of 18 mol percent.

Titanium dioxide and zirconium dioxide are preferably used as component (B) of the additive of this invention, so that organopolysiloxane elastomers are preferably obtained, which are both flame retardant and also have high tracking resistance and arc resistance. The titanium dioxide used is, in particular, fine-particle, titanium dioxide produced pyrogenically in the gas phase.

Examples of the compounds or complexes of platinum used as component (C) of the additive according to the invention are $H_2[PtCl_6]\cdot 6H_2O$, platinum-olefin complexes, platinumalcohol complexes, platinum-alcoholate complexes, platinumether complexes, platinum-aldehyde complexes, platinum-ketone complexes, including reaction products from $H_2[PtCl_6]\cdot 6H_2O$ and cyclohexanone, platinum-vinylsiloxane complexes, particularly platinum-1,3-divinyl-1,1,3,3-tetramethyldisiloxane complexes with or without a detectable organic halogen, platinum-norbornadiene-methylacetonate complexes, bis(gammapicoline)platinum dichloride, trimethylenedipyridineplatinum dichloride, dicyclopentadieneplatinum dichloride, dimethylsulfoxide ethyleneplatinum(II) dichloride and reaction products of platinum tetrachloride with an olefin and a primary amine or secondary amine or primary and secondary amine such as the reaction product from platinum tetrachloride dissolved in 1-octene with sec-butylamine, or ammonium-platinum complexes according to EP-B 110 370.

Preferably, the organosilicon compounds having basic nitrogen bonded via carbon to silicon, which form the component (D) of the additive according to the invention are those selected from the group of silanes of the formula $Y_a R_b Si(OR^1)_{4-a-b}$, in which R represents the same or different monovalent hydrocarbon radicals having from 1 to 8 carbon atoms per radical, $R^1$ represents the same or different alkyl groups having from 1 to 4 carbon atoms per radical or a radical of the formula $-SiR_3$, in which R is the same as above, Y represents the same or different, monovalent SiC-bonded organic radicals having a basic nitrogen, a is 1 or 2 and b is 0, 1 or 2, and disiloxanes of the formula $$(Y_cR_dSi)_2O,$$

in which R and Y are the same as above, c is 0, 1, 2 or 3, preferably 1, provided that the disiloxanes have at least one Y radical and d is 0, 1, 2 or 3, preferably 2.

The organosilicon compounds having basic nitrogen bonded via carbon to silicon may also include organo(poly)siloxanes having a maximum of 10 Si atoms and having units of the formula $$Y_xR_ySi(OR^1)_zO_{\frac{4-x-y-z}{2}}$$

in which R and $R^1$ are the same as above, x is 0, 1 or 2, y is 0, 1, 2 or 3 and z is 0, 1 or 2.

Examples of hydrocarbon radicals represented by R are the methyl, ethyl, n-propyl, isopropyl and 2-ethylhexyl radical, and butyl radicals; radicals having carbon and hydrogen atoms with an aliphatic multiple bond, such as the vinyl radical and allyl radical; cycloaliphatic hydrocarbon radicals, such as the cyclopentyl and cyclohexyl radicals, and methylcyclohexyl radicals; aromatic hydrocarbon radicals, such as the phenyl radical and xenyl radicals; alkaryl radicals, such as tolyl radials; and aralkyl radicals such as the benzyl radical. Preferably, the hydrocarbon radicals R are free from aliphatic multiple bonds, especially when they are bonded to silicon atoms to which basic nitrogen is also bonded via carbon. Due to their availability, it is preferred that at least 50 percent of the number of R radicals be methyl radicals.

The examples mentioned above for alkyl radicals represented by R having from 1 to 4 carbon atoms per radical are also applicable to the radicals represented by $R^1$.

Preferably the Y radicals are those of the formula $$R^2NHR^3-,$$

in which $R^2$ represents hydrogen or the same or different alkyl radicals or cycloalkyl radicals or aminoalkyl radicals having from 1 to 8 carbon atoms per radical and $R^3$ represents equal or different straight-chain or branched hydrocarbon radicals which are free from aliphatic multiple bonds, having one carbon atom or 3 or 4 carbon atoms per radical, preferably a radical of the formula $$—(CH_2)_3—.$$

The examples of alkyl radicals and cycloalkyl radicals R are also applicable to alkyl radicals or cycloalkyl radicals represented by $R^2$.

Examples of the aminoalkyl radicals represented by $R^2$ are those of the formula $H_2N(CH_2)_3—$
$H_2N(CH_2)_2NH(CH_2)_2—$
$H_2N(CH_2)_2—$
$(H_3C)_2NH(CH_2)_2—$
$H_2N(CH_2)_4—$
$H(NHCH_2CH_2)_3—$ and
$C_4H_9NH(CH_2)_2NH(CH_2)_2—.$ Examples of organosilicon compounds (D) having basic nitrogen bonded via carbon to silicon are N-(2-aminoalkyl)-3-aminopropyltrimethoxysilane, N-(2-aminoethyl)-3-aminopropyltriethoxysilane, N-(2-aminoethyl)-3-aminopropylmethyldimethoxysilane, 3-aminopropyltriethoxysilane, N-(cyclohexyl)-3-aminopropyltrimethoxysilane, N-(2-aminoethyl)-3-aminopropyl-tris(trimethylsiloxy)-silane and 1,2-bis[N-(2-aminoethyl)-3-aminopropyl]-1,2,2,2-tetramethyldisiloxane.

The use of N-(2-aminoethyl)-3-aminopropyltrimethoxysilane is preferred.

Components (A) to (D) of the additive according to the invention are mixed together in a mixer or kneader. After mixing or kneading for at least two hours and after allowing the mixture to stand at room temperature for two to three days, the additive can be used. Preferably, the mixture is made ready for use, after heating for at least 120 minutes at 80° to 150° C.

The compositions of this invention, which can be crosslinked to form organopolysiloxane elastomers, preferably contain 1 to 4 percent by weight of the additive based on the total weight of the composition. It must be ensured, that in two-component compositions which crosslink by addition, the additive is not added to the component which contains the organopolysiloxane having hydrogen bonded to silicon, in order to prevent premature crosslinking of the compositions.

The vinyl-rich diorganopolysiloxane (A), the platinum compound or the platinum complex (C) and the organosilicon compound (D) having a basic nitrogen bonded via carbon to silicon are reacted together by being allowed to stand for several days or are heated together with the metal oxides, which merely intensify the effect, and added as the additive, in only relatively small amounts to the other components of the composition which can be crosslinked to form polyorganosiloxane elastomers, in order to obtain flame retardant organopolysiloxane elastomers or flame retardant organopolysiloxane elastomers having high tracking resistance and arc resistance.

The coloration of the compositions which can be crosslinked to form organopolysiloxane elastomers is not impaired by the small amount of additive. Moreover, pourable compositions which crosslink to form tracking resistant organopolysiloxane elastomers and those compositions which crosslink to form soft, tracking resistant organopolysiloxane elastomers having a Shore A hardness below 50, are also obtained from this invention. Furthermore, the additive of this invention forms flame retardant organopolysiloxane elastomers independently of the type of crosslinking agent. Thus, the effect of the additive is not impaired by peroxides during the peroxide crosslinking of the compositions to form organopolysiloxane elastomers.

In addition to the additive used according to this invention, the compositions of this invention, which can be crosslinked to form organopolysiloxane elastomers, may contain the same components, which have been or could have been present in compositions which can be crosslinked to form organopolysiloxane elastomers, but are free of the additive used according to this invention. These components and their ratios have been described heretofore in various publications, so that they need not be further described here.

The crosslinking of the compositions of this invention which can be crosslinked to form organopolysiloxane elastomers may be carried out in any desired manner.

The crosslinking of the compositions according to this invention to form organopolysiloxane elastomers may, for example, be carried out by free radical forming agents in a known manner. Examples of agents of this type are peroxide compounds, such as acyl peroxides, for example, dibenzoyl peroxide, bis(4-chlorobenzoyl) peroxide and bis(2,4-dichlorobenzoyl) peroxide; alkyl peroxides and aryl peroxides, such as di-tert-butyl peroxide and dicumyl peroxide; perketals, such as 2,5-bis(-tert-butylperoxy)-2,5-dimethylhexane; peresters, such as diacetylperoxy dicarbonate, tert-butyl perbenzoate and tert-butyl perisononanoate. Other free radical forming agents which may be employed are tert-butyl beta-hydroxyethylperoxide and azo compounds, such as azobisisobutyronitrile.

The crosslinking of the compositions of this invention to form organopolysiloxane elastomers may also be carried out, for example, by high energy rays, such as alpha, beta or gamma rays, in a known manner.

The crosslinking of the compositions according to this invention to form organopolysiloxane elastomers may also be carried out, for example, by the addition of silicon bonded hydrogen to aliphatic carbon-carbon multiple bonds in a known manner. It is possible for the compositions to be present in the so-called "one-component systems" or so-called "two-component systems".

The crosslinking of the compositions of this invention to form organopolysiloxane elastomers may, for example, also be carried out by condensation in a known manner. These compositions may be present as the so-called "one-component systems" or so-called "two-component systems". The crosslinking of the compositions of this invention to form organopolysiloxane elastomers may also be carried out at room temperature or at temperatures of from 40° to 200° C., in which it is possible to use so-called "RTV compositions" or so-called "HTV compositions".

The compositions of this invention which can be crosslinked to form flame retardant and/or tracking resistant and arc resistant organopolysiloxane elastomers may be used for all purposes, for which compositions which can be crosslinked to form flame retardant and/or tracking resistant and arc resistant organopolysiloxane elastomers can be used. For example, they may be used in the production of electrical insulation materials, medium and high tension insulators, cable end pieces, cable coupling boxes, anode caps for televisions tubes and compression moldings and extrusions for the aviation industry.

In the following examples, all parts are by weight.

The mixture of platinum-vinylsiloxane complex and diluents used in the following examples was prepared as follows:

About 20 parts of sodium bicarbonate were added to a mixture containing 10 parts of $H_2PtCl_6.6H_2O$, 20 parts of 1,3-divinyl-1,1,3,3-tetramethyldisiloxane and 50 parts of ethanol. The mixture was refluxed for 30 minutes with stirring, then allowed to stand for 15 hours and then subsequently filtered. The volatile components were distilled off from the filtrate at about 16 hPa (abs.). About 17 parts of a liquid were obtained as residue, which was dissolved in benzene. The solution was filtered and the benzene was distilled off from the filtrate. The residue was mixed with dimethylpolysiloxane having dimethylvinylsiloxane units as terminal units and having a viscosity of 1400 mPa.s at 25° C. as diluent, in an amount such that the mixture contains 1 percent by weight of platinum, calculated as the element.

EXAMPLE 1

(a) About 100 parts of a dimethylpolysiloxane having 20 mole percent of vinylmethylsiloxane units and a viscosity of 50000 mPa.s at 25° C. are homogeneously mixed in a stirring device with 50 parts of titanium dioxide produced pyrogenically in the gas phase and then 25 parts of the mixture of platinum-vinylsiloxane complex and diluent containing 1 percent by weight of platinum, calculated as the element, are added. After the mixture has been thoroughly mixed, 4 parts of N-(2-aminoethyl)-3-aminopropyltrimethoxysilane are mixed into the mixture. The mixture is then heated slowly to 150° C. with vigorous stirring and stirred for an additional two hours at 150° C.

(b) About 100 parts of a diorganopolysiloxane which is endblocked with trimethylsiloxy groups and having 99.93 mole percent of dimethylsiloxane units and 0.07 mol percent of vinylmethylsiloxane units and a viscosity of $8 \times 10^6$ mPa.s at 25° C. are mixed initially in a kneader operated at 150° C. with 50 parts of silicon dioxide produced pyrogenically in the gas phase and having a surface area of 200 $m^2/g$, then 1 part of a dimethylpolysiloxane endblocked with trimethylsiloxy groups, and having a viscosity of 96 mPa.s at 25° C., is added to the mixture. About 7 parts of a dimethylpolysiloxane having a hydroxyl group bonded to Si in each of the terminal units and a viscosity of 50 mPa.s at 25° C. is added to the mixture, then an additional 1 part of dimethylpolysiloxane endblocked with trimethylsiloxy groups and having a viscosity of 95 mPa.s at 25° C., is added and the mixture is finally mixed with 2.8 parts of a paste made from equal parts of bis(2,4-dichlorobenzoyl) peroxide and a dimethylpolysiloxane endblocked with trimethylsiloxy groups and having a viscosity of 250 mPa.s at 25° C.

About 98 parts of the mixture obtained in this manner are mixed with two parts of the additive, whose preparation was described under (a) above. Sheets 2 mm in thickness are produced from this mixture by vulcanizing at 150° C. The flame resistance is determined on 1 part of the sheets, the extent of flame resistance being given in each case by the LOI (limited oxygen index) value, which is determined in accordance with ASTM D 2863-70. The higher the LOI value, the higher the extent of flame resistance. The other part of the sheets, after vulcanization, is conditioned for four hours at 200° C. The arc resistance in accordance with DIN 57 441 and the tracking resistance in accordance with DIN 57 303 are determined. The weight loss occurring after determination of the tracking resistance is also established. The results are summarized in Table 1.

TABLE 1

| LOI | 33 percent |
|---|---|
| Arc resistance | 350 sec |
| Tracking resistance | 3.5 KV |
| Weight loss occurring | 0.25 percent |

COMPARISON EXAMPLE 1

(a) The procedure described in Example 1(a) above is repeated, except that N-(2-aminoethyl)-3-aminopropyl-trimethoxysilane is omitted.

(b) The procedure described in Example 1(b) is repeated, except that 2 parts of the additive without aminosilane, whose preparation was described in (a) above, are used instead of 2 parts of the additive with aminosilane, whose preparation was described in Example 1(a).

The values for the flame resistance, arc resistance and tracking resistance, which were determined as described in Example 1 are summarized in Table 2.

TABLE 2

| LOI | 28 percent |
| --- | --- |
| Arc resistance | 150 sec |
| Tracking resistance | 2 KV |

COMPARISON EXAMPLE 2

The procedure described in Example 1(b) is repeated, except that the additive is omitted.

The values for the flame resistance, arc resistance and tracking resistance, which were determined in accordance with Example 1, are summarized in Table 3.

TABLE 3

| LOI | 23 percent |
| --- | --- |
| Arc resistance | 120 sec |
| Tracking resistance | 1.5 KV |

COMPARISON EXAMPLE 3

The procedure described in Example 1(b) is repeated, except that 3 parts of titanium dioxide produced pyrogenically in the gas phase, 0.3 parts of cyanoguanidine and 45 ppm by weight of platinum, calculated as the element in the form of the platinum-vinyl-siloxane complex as additive in accordance with U.S. Pat. No. 4,419,474 are added to 100 parts of the mixture thus obtained instead of 98 parts of the mixture thus obtained and 2 parts of the additive, whose preparation was described in Example 1(a).

The values for the flame resistance, arc resistance and tracking resistance (together with the weight loss), which were determined as described in accordance with Example 1, are summarized in Table 4.

TABLE 4

| LOI | 29 percent |
| --- | --- |
| Arc resistance | 280 sec |
| Tracking resistance | 3.5 KV |
| Weight loss occurring | 3.5 percent |

EXAMPLE 2

About 100 parts of a diorganopolysiloxane endblocked with trimethylsiloxy groups and containing 99.93 mol percent of dimethylsiloxane units and 0.07 mol percent of vinylmethylsiloxane units and having a viscosity of $8 \times 10^6$ mPa.s at 25° C. are initially mixed in a kneader operated at 150° C. with 50 parts of silicon dioxide produced pyrogenically in the gas phase and having a surface area of 200 m$^2$/g, then mixed with 1 part of dimethylpolysiloxane endblocked with trimethylsiloxy groups, and having a viscosity of 96 mPa.s at 25° C. The mixture is then mixed with 7 parts of a dimethylpolysiloxane having a hydroxyl group bonded to Si in the terminal units and a viscosity of 40 mPa.s at 25° C., then mixed again with 1 part of dimethylpolysiloxane endblocked with trimethylsiloxy groups, having a viscosity of 95 mPa.s at 25° C. and then finally mixed with 1.2 parts of dicumyl peroxide.

About 98 parts of the resultant mixture are mixed with 2 parts of the additive, whose preparation was described in Example 1(a). Sheets, 2 mm in thickness are produced by vulcanization from this mixture. The flame resistance is determined on one part of these sheets in accordance with ASTM D 2863-70. The other part of the sheets, after vulcanization, is conditioned for four hours at 200° C. The arc resistance is then determined in accordance with DIN 57 441, the tracking resistance determined in accordance with DIN 57 303. The determination of the Shore A hardness is then carried out in accordance with DIN 53 505 using standard test piece S 3A, the determination of the ultimate tensile strength and the elongation at break in accordance with DIN 53 504 using standard test piece S 3A and the determination of tear propagation resistance in accordance with ASTM D 624 using standard test piece B. The results are summarized in Table 5.

TABLE 5

| LOI | 32.5 percent |
| --- | --- |
| Arc resistance | 350 sec |
| Tracking resistance | 3.5 KV |
| Shore A hardness | 42 |
| Ultimate tensile strength | 8.0 N/mm$^2$ |
| Elongation at break | 600 percent |
| Tear propagation | >22 N/mm |

COMPARISON EXAMPLE 4

(a) The procedure described in Example 1(a) is repeated, except that N-(2-aminoethyl)-3-aminopropyl-trimethoxysilane is omitted.

(b) The procedure of Example 2 is repeated, except that 2 parts of the additive without aminosilane, whose preparation was described in (a) above are used instead of 2 parts of the additive with aminosilane, whose preparation was described in Example 1(a).

The values for the flame resistance, arc resistance and tracking resistance, which were determined in accordance with Example 2, are summarized in Table 6.

TABLE 6

| LOI | 26 percent |
| --- | --- |
| Arc resistance | 150 sec |
| Tracking resistance | 2 KV |

COMPARISON EXAMPLE 5

The procedure of Example 2 is repeated, except that the additive was omitted.

The values for the flame resistance, arc resistance and tracking resistance, which were determined in accordance with Example 2, are summarized in Table 7.

TABLE 7

| LOI | 22 percent |
| --- | --- |
| Arc resistance | 120 sec |
| Tracking resistance | 1.5 KV |

COMPARISON EXAMPLE 6

The procedure of Example 2 is repeated, except that a mixture made from 40 parts of silicon dioxide produced pyrogenically in the gas phase having a BET surface area of 200 m$^2$/b and 100 parts of hydrated aluminum oxide Al$_2$O$_3$.3H$_2$O is used instead of the 50 parts of silicon dioxide produced pyrogenically in the gas phase having a BET surface area of 200 m$^2$/g and no additive is added.

The values for the flame resistance, arc resistance and tracking resistance and for the mechanical properties, which were determined in accordance with Example 2, are summarized in Table 8.

TABLE 8

| LOI | 40 percent |
|---|---|
| Arc resistance | 320 sec |
| Tracking resistance | 3.5 KV |
| Shore A hardness | 66 |
| Ultimate tensile strength | 5.5 N/mm$^2$ |
| Elongation at break | 200 percent |
| Tear propagation resistance | 13 N/mm |

What is claimed is:

1. A composition which can be crosslinked to form flame retardant and/or tracking resistant and arc resistant organopolysiloxane elastomers, comprising a crosslinkable organopolysiloxane composition containing an additive, which is obtained by mixing:
   (A) 60 to 80 percent by weight of diorganopolysiloxane having 75 to 85 mol percent of dimethylsiloxane units and 15 to 25 mol percent of vinylmethylsiloxane units,
   (B) 20 to 35 percent by weight of a metal oxide selected from the group consisting of titanium dioxide, zirconium dioxide, zinc oxide, Ce(III) oxide and Ce(IV) oxide, with the proviso that only titanium dioxide or zirconium dioxide is used to achieve tracking resistance and arc resistance,
   (C) 0.05 to 0.25 percent by weight of platinum, selected from the group consisting of a platinum compound and a platinum complex, calculated as the element, and
   (D) 1 to 5 percent by weight of an organosilicon compound having basic nitrogen bonded via carbon to silicon
   in which the sum of the percentages of (A) to (D) is equal to 100 percent by weight and the percent by weight is based on the total weight of the additive.

2. The composition of claim 1, wherein the additive is present in an amount of from 1 to 4 percent by weight based on the total weight of the composition.

3. The composition of claim 1, wherein the additive is heated from 80° C. to 150° C. for at least 120 minutes prior to mixing with the crosslinkable organopolysiloxane composition.

4. The composition of claim 2, wherein the additive is heated from 80° C. to 150° C. for at least 120 minutes prior to mixing with the crosslinkable organopolysiloxane composition.

5. The composition of claim 1, wherein the organosilicon compound (D) having a basic nitrogen bonded via carbon to silicon is selected from the group consisting of silanes of the formula $$Y_aR_bSi(OR^1)_{4-a-b},$$

in which R is a monovalent hydrocarbon radical having from 1 to 8 carbon atoms per radical, R$^1$ is selected from the group consisting of alkyl groups having from 1 to 4 carbon atoms per radical and a radical of the formula —SiR$_3$, in which R is the same as above, Y is a monovalent SiC-bonded organic radical having a basic nitrogen, a is 1 or 2 and b is 0, 1 or 2 and disiloxanes of the formula $$(Y_cR_dSi)_2O,$$

in which R and Y are the same as above, c is 0, 1, 2 or 3, with the proviso that the disiloxanes have at least one Y radical and d is 0, 1, 2 or 3.

6. The composition of claim 2, wherein the organosilicon compound (D) having a basic nitrogen bonded via carbon to silicon is selected from the group consisting of silanes of the formula $$Y_aR_bSi(OR^1)_{4-a-b},$$

in which R is a monovalent hydrocarbon radical having from 1 to 8 carbon atoms per radical, R$^1$ is selected from the group consisting of alkyl groups having from 1 to 4 carbon atoms per radical and a radical of the formula —SiR$_3$, in which R is the same as above, Y is a monovalent SiC-bonded organic radical having a basic nitrogen, a is 1 or 2 and b is 0, 1 or 2 and disiloxanes of the formula $$(Y_cR_dSi)_2O,$$

in which R and Y are the same as above, c is 0, 1, 2 or 3, with the proviso that the disiloxanes have at least one Y radical and d is 0, 1, 2 or 3.

7. The composition of claim 3, wherein the organosilicon compound (D) having a basic nitrogen bonded via carbon to silicon is selected from the group consisting of silanes of the formula $$Y_aR_bSi(OR^1)_{4-a-b},$$

monovalent hydrocarbon radical having from 1 to 8 carbon atoms per radical, R$^1$ is selected from the group consisting of alkyl groups having from 1 to 4 carbon atoms per radical and a radical of the formula —SiR$_3$, in which R is the same as above, Y is a monovalent SiC-bonded organic radical having a basic nitrogen, a is 1 or 2 and b is 0, 1 or 2 and disiloxanes of the formula $$(Y_cR_dSi)_2O,$$

in which R and Y are the same as above, c is 0, 1, 2 or 3, with the proviso that the disiloxanes have at least one Y radical and d is 0, 1, 2 or 3.

8. The composition of claim 4, wherein the organosilicon compound (D) having a basic nitrogen bonded via carbon to silicon is selected from the group consisting of silanes of the formula $$Y_aR_bSi(OR^1)_{4-a-b},$$

in which R is a monovalent hydrocarbon radical having from 1 to 8 carbon atoms per radical, R$^1$ is selected from the group consisting of alkyl groups having from 1 to 4 carbon atoms per radical and a radical of the formula —SiR$_3$, in which R is the same as above, Y is a monovalent SiC-bonded organic radical having a basic nitrogen, a is 1 or 2 and b is 0, 1 or 2 and disiloxanes of the formula $$(Y_cR_dSi)_2O,$$

in which R and Y are the same as above, c is 0, 1, 2 or 3, with the proviso that the disiloxanes have at least one Y radical and d is 0, 1, 2 or 3.

9. A process for preparing a composition which can be crosslinked to form flame retardant and/or tracking resistant and arc resistant organopolysiloxane elastomers, which comprises adding to a crosslinkable organopolysiloxane composition an additive, which is obtained by mixing (A) 60 to 80 percent by weight of diorganopolysiloxane having 75 to 85 mol percent of dimethylsiloxane units and 15 to 25 mol percent of vinylmethylsiloxane units;

(B) 20 to 35 percent by weight of a metal oxide selected from the group of titanium dioxide, zirconium dioxide, zinc oxide, Ce(III) oxide and Ce(IV) with the proviso that only titanium dioxide or zirconium dioxide is used to achieve tracking resistance and arc resistance;

(C) 0.05 to 0.25 percent by weight of platinum, selected from the group consisting of a platinum compound and a platinum complex, calculated as the element; and (D) 1 to 5 percent by weight of an organosilicon compound having a basic nitrogen bonded via carbon to silicon in which the sum of the percentages of (A) to (D) is equal to 100 percent by weight and the percent by weight is based on the total weight of the additive.

10. The process of claim 9, wherein the additive is present in an amount of from 1 to 4 percent by weight, based on total weight of the composition.

11. The process of claim 9, wherein the additive is heated at 80° C. to 150° C. for at least 120 minutes prior to mixing with the crosslinkable organopolysiloxane composition.

12. The process of claim 10, wherein the additive is heated at 80° C. to 150° C. for at least 120 minutes prior to mixing with the crosslinkable organopolysiloxane composition.

13. The process of claim 9, wherein the organosilicon compound (D) having a basic nitrogen bonded via carbon to silicon is selected from the group consisting of silanes of the formula $Y_aR_bSi(OR^1)_{4-a-b}$ in which R is a monovalent hydrocarbon radical having from 1 to 8 carbon atoms per radical, $R^1$ is selected from the group consisting of alkyl groups having from 1 to 4 carbon atoms per radical and a radical of the formula $-SiR_3$, in which R is the same as above, Y is a monovalent SiC-bonded organic radical having a basic nitrogen, a is 1 or 2 and b is 0, 1 or 2, and disiloxanes of the formula $(Y_cR_dSi)_2O$, in which R and Y are the same as above, c is 0, 1, 2 or 3, with the proviso that the disiloxanes have at least one Y radical and d is 0, 1, 2 or 3.

14. The process of claim 10, wherein the organosilicon compound (D) having a basic nitrogen bonded via carbon to silicon is selected from the group consisting of silanes of the formula $Y_aR_bSi(OR^1)_{4-a-b}$ in which R is a monovalent hydrocarbon radical having from 1 to 8 carbon atoms per radical, $R^1$ is selected from the group consisting of alkyl groups having from 1 to 4 carbon atoms per radical and a radical of the formula $-SiR_3$, in which R is the same as above, Y is a monovalent SiC-bonded organic radical having a basic nitrogen, a is 1 or 2 and b is 0, 1 or 2, and disiloxanes of the formula $(Y_cR_dSi)_2O$, in which R and Y are the same as above, c is 0, 1, 2 or 3, with the proviso that the disiloxanes have at least one Y radical and d is 0, 1, 2 or 3.

15. The process of claim 11, wherein the organosilicon compound (D) having a basic nitrogen bonded via carbon to silicon is selected from the group consisting of silanes of the formula $Y_aR_bSi(OR^1)_{4-a-b}$ in which R is a monovalent hydrocarbon radical having from 1 to 8 carbon atoms per radical, $R^1$ is selected from the group consisting of alkyl groups having from 1 to 4 carbon atoms per radical and a radical of the formula $-SiR_3$, in which R is the same as above, Y is a monovalent SiC-bonded organic radical having a basic nitrogen, a is 1 or 2 and b is 0, 1 or 2, and disiloxanes of the formula $(Y_cR_dSi)_2O$, in which R and Y are the same as above, c is 0, 1, 2 or 3, with the proviso that the disiloxanes have at least one Y radical and d is 0, 1, 2 or 3.

16. The process of claim 12, wherein the organosilicon compound (D) having a basic nitrogen bonded via carbon to silicon is selected from the group consisting of silanes of the formula $Y_aR_bSi(OR^1)_{4-a-b}$ in which R is a monovalent hydrocarbon radical having from 1 to 8 carbon atoms per radical, $R^1$ is selected from the group consisting of alkyl groups having from 1 to 4 carbon atoms per radical and a radical of the formula $-SiR_3$, in which R is the same as above, Y is a monovalent SiC-bonded organic radical having a basic nitrogen, a is 1 or 2 and b is 0, 1 or 2, and disiloxanes of the formula $(Y_cR_dSi)_2O$, in which R and Y are the same as above, c is 0, 1, 2 or 3, with the proviso that the disiloxanes have at least one Y radical and d is 0, 1, 2 or 3.

17. An additive which will impart flame retardant and/or tracking resistant and arc resistant properties to crosslinked organopolysiloxane compositions comprising:

(A) 60 to 80 percent by weight of diorganopolysiloxane having 75 to 85 mol percent of dimethylsiloxane units and 15 to 25 mol percent of vinylmethylsiloxane units, (B) 20 to 35 percent by weight of a metal oxide selected from the group consisting of titanium dioxide, zirconium dioxide, zinc oxide, Ce(III) oxide and Ce(IV) oxide, with the proviso that only titanium dioxide or zirconium dioxide is used to achieve tracking resistance and arc resistance, (C) 0.05 to 0.25 percent by weight of platinum, selected from the group consisting of a platinum compound and a platinum complex, calculated as the element, and (D) 1 to 5 percent by weight of an organosilicon compound having basic nitrogen bonded via carbon to silicon in which the sum of the percentages of (A) to (D) is equal to 100 percent by weight and the percent by weight is based on the total weight of the additive.

18. The composition of claim 17, wherein the organosilicon compound (D) having a basic nitrogen bonded via carbon to silicon is selected from the group consisting of silanes of the formula $$Y_a R_b Si(OR^1)_{4-a-b}$$

in which R is a monovalent hydrocarbon radical having from 1 to 8 carbon atoms per radical, $R^1$ is selected from the group consisting of alkyl groups having from 1 to 4 carbon atoms per radical and a radical of the formula —$SiR_3$, in which R is the same as above, Y is a monovalent SiC-bonded organic radical having a basic nitrogen, a is 1 or 2 and b is 0, 1 or 2 and disiloxanes of the formula $$(Y_c R_d Si)_2 O,$$

in which R and Y are the same as above, c is 0, 1, 2 or 3, with the proviso that the disiloxanes have at least one Y radical and d is 0, 1, 2 or 3.

19. A method for preparing an additive which will impart flame retardant and/or tracking resistant and arc resistant properties to crosslinked organopolysiloxane compositions which comprises mixing:
(A) 60 to 80 percent by weight of diorganopolysiloxane having 75 to 85 mol percent of dimethylsiloxane units and 15 to 25 mol percent of vinylmethylsiloxane units, with
(B) 20 to 35 percent by weight of a metal oxide selected from the group consisting of titanium dioxide, zirconium dioxide, zinc oxide, Ce(III) oxide and Ce(IV) oxide, with the proviso that only titanium dioxide or zirconium dioxide is used to achieve tracking resistance and arc resistance,
(C) 0.05 to 0.25 percent by weight of platinum, selected from the group consisting of a platinum compound and a platinum complex, calculated as the element, and
(D) 1 to 5 percent by weight of an organosilicon compound having basic nitrogen bonded via carbon to silicon in which the sum of the percentages of (A) to (D) is equal to 100 percent by weight based on the weight of the additive, heating the mixture to a temperature of from 80° to 150° C. for at least 120 minutes prior to mixing with a crosslinkable organopolysiloxane composition.

20. The process of claim 19, wherein the organosilicon compound (D) having a basic nitrogen bonded via carbon to silicon is selected from the group consisting of silanes of the formula $$Y_a R_b Si(OR^1)_{4-a-b}$$

in which R is a monovalent hydrocarbon radical having from 1 to 8 carbon atoms per radical, $R^1$ is selected from the group consisting of alkyl groups having from 1 to 4 carbon atoms per radical and a radical of the formula —$SiR_3$, in which R is the same as above, Y is a monovalent SiC-bonded organic radical having a basic nitrogen, a is 1 or 2 and b is 0, 1 or 2 and disiloxanes of the formula $$(Y_c R_d Si)_2 O,$$

in which R and Y are the same as above, C is 0, 1, 2 or 3, with the proviso that the disiloxanes have at least one Y radical and d is 0, 1, 2 or 3.

* * * * *